US007094623B2

(12) United States Patent
Sato et al.

(10) Patent No.: US 7,094,623 B2
(45) Date of Patent: Aug. 22, 2006

(54) METHOD FOR PRODUCING SEMICONDUCTOR NANOPARTICLES AND SEMICONDUCTOR NANOPARTICLES PRODUCED BY THE SAME

(75) Inventors: Keiichi Sato, Tokyo (JP); Susumu Kuwabata, Osaka (JP)

(73) Assignee: Hitachi Software Engineering Co., Ltd., Kanagawa (JP)

( * ) Notice: Subject to any disclaimer, the term of this patent is extended or adjusted under 35 U.S.C. 154(b) by 311 days.

(21) Appl. No.: 10/453,546

(22) Filed: Jun. 4, 2003

(65) Prior Publication Data

US 2003/0228761 A1 Dec. 11, 2003

(30) Foreign Application Priority Data

Jun. 10, 2002 (JP) ............ 2002-168109

(51) Int. Cl.
*H01L 31/352* (2006.01)
(52) U.S. Cl. .......... 438/63; 257/E31.032; 977/889
(58) Field of Classification Search ............ 438/63, 438/84, 746, 57; 117/68, 70; 423/99, 102; 257/E31.032, E29.071; 977/773, 774, 889, 977/893

See application file for complete search history.

(56) References Cited

U.S. PATENT DOCUMENTS

| | | |
|---|---|---|
| 6,179,912 B1 | 1/2001 | Barbera-Guillem et al. |
| 6,410,935 B1 | 6/2002 | Rajh et al. |
| 6,607,829 B1 | 8/2003 | Bawendi et al. |
| 6,649,138 B1 | 11/2003 | Adams et al. |
| 6,788,453 B1 | 9/2004 | Banin et al. |
| 6,906,339 B1 | 6/2005 | Dutta |
| 6,911,082 B1 | 6/2005 | Sato et al. |

| | | | |
|---|---|---|---|
| 2003/0129311 A1* | 7/2003 | Huang | ......... 427/337 |
| 2003/0228761 A1 | 12/2003 | Sato et al. | |

FOREIGN PATENT DOCUMENTS

| | | |
|---|---|---|
| JP | 2004-008982 | 6/2002 |
| JP | 2003-352594 | 5/2003 |
| WO | WO 99/26299 | 11/1998 |
| WO | WO 02/31191 A2 | 9/2001 |

OTHER PUBLICATIONS

Behboudnia et al. "Systematics in the nanoparticle band gap of ZnS and Zn1-xMxS (M=Mn,Fe,Ni) for various dopant concentrations." Physical Review B. vol. 63. pp. 035316-1 through 035316-5. Jan. 2, 2001.*

(Continued)

*Primary Examiner*—Carl Whitehead, Jr.
*Assistant Examiner*—Jennifer M Dolan
(74) *Attorney, Agent, or Firm*—Reed Smith LLP; Stanley P. Fisher, Esq.; Juan Carlos A. Marquez, Esq.

(57) ABSTRACT

This invention provides a method for producing semiconductor nanoparticles having a monodispersed distribution of particle sizes and the semiconductor nanoparticles produced by the same, which were insufficient in conventional reversed micelle methods. This method for producing semiconductor nanoparticles comprises steps of: forming semiconductor nanoparticles in the reaction field in the micelle or in the reversed micelle; and regulating the particle size of the semiconductor nanoparticles by size-selective photoetching, wherein the reaction field in the micelle or in the reversed micelle serves also as the dissolution field for ions that are produced when the semiconductor nanoparticles are subjected to size-selective photoetching. In this method, particle sizes of the semiconductor nanoparticles are regulated by adjusting the size of the dissolution field for ions and regulating the reactivity of size-selective photoetching.

4 Claims, 2 Drawing Sheets

OTHER PUBLICATIONS

Kim et al. "Self-narrowing and photoetching effects on the size distribution of CdS quantum dots prepared by a reverese-micelle method." Japanese Journal of Applied Physics—part 1, vol. 41, No. 8, p. 5064-8. Aug. 2002. (abstract only).*

Kevin L. Stokes, Jiye Fang and Charles J. O'Connor, "Synthesis and Properties of Bismuth Nanocrystals", 18th International Conference on Thermoelectrics (1999), pp. 374-377.

Tsukasa Torimoto, Hironori Kontani, Yoshihiro Shibutani, Susumu Kuwabata, Takao Sakata, Hirotaro Mori, and Hiroshi Yoneyama, "Characterization of Ultrasmall CdS Nanoparticles Prepared by the Size-Selective Photoetching Technique", J. Phys. Chem. B, vol. 105, No. 29, 2001, pp. 6838-6845.

Masahide Miyake, Tsukasa Torimoto, Takao Sakata, Hirotaro Mori, and Hiroshi Yoneyama, "Photoelectrochemical Characterization of Nearly Monodisperse CdS Nanoparticles—Immobilized Gold Electrodes", Langmuir, vol. 15, No. 4, 1999, 15. pp. 1503-1507.

Dr. Roland Liesegang, Forrester & Boehmert, "letter regarding search report and the cited reference", dated Sep. 30, 2003.

European Search Report, dated Sep. 30, 2003.

U.S. Appl. No. 10/648,399, filed Aug. 27, 2003, Sato et al.

Tsukasa Torimoto et al., "Characterization of Ultrasmall CdS Nanoparticles Prepared by the Size-Selective Photoetching Technique", J. Phys. Chem. B. vol. 105, No. 29, (2001), pp. 6838-6845.

* cited by examiner

METHOD FOR PRODUCING SEMICONDUCTOR NANOPARTICLES AND SEMICONDUCTOR NANOPARTICLES PRODUCED BY THE SAME

TECHNICAL FIELD

The present invention relates to a method for producing semiconductor nanoparticles and the semiconductor nanoparticles produced by the same. More particularly, the present invention relates to a method for producing monodisperse semiconductor nanoparticles that emit fluorescences of a narrow wavelength width and the semiconductor nanoparticles produced by the same.

BACKGROUND ART

Semiconductor nanoparticles whose particle sizes are 10 nm or less are located in the transition region between bulk semiconductor crystals and molecules. Their physicochemical properties are therefore different from both bulk semiconductor crystals and molecules. In this region, due to the quantum-size effect, the energy gap of semiconductor nanoparticles increases as their particle sizes decrease. In addition, the degeneration of the energy band that is observed in bulk semiconductors is removed and the orbits are dispersed. As a result, the lower-end of the conduction band is shifted to the negative side and the upper-end of the valence band is shifted to the positive side.

Semiconductor nanoparticles exhibit spectra with peaks whose full widths at half maximum are relatively narrow. Accordingly, particle size regulation of semiconductor nanoparticles enables the development of various reagents which exhibit spectra whose full widths at half maximum are narrow. This enables the multi-color analyses in, for example, the detection and the imaging of biopolymers. Compared to common organic pigments, semiconductor nanoparticles are more durable and fade less.

Semiconductor nanoparticles can be easily prepared by dissolving equimolar amounts of precursors of Cd and X (X being S, Se or Te). This is also true for the manufacturing of, for example, CdSe, ZnS, ZnSe, HgS, HgSe, PbS, or PbSe.

Semiconductor nanoparticles have drawn attention since they emit strong fluorescences whose full widths at half maximum are narrow. Thus, various fluorescent colors can be created, and their future applications can be nearly infinite. However, the semiconductor nanoparticles obtained by the above method exhibit a wide distribution of particle sizes and therefore cannot provide the full advantage of the properties of semiconductor nanoparticles. Attempts have been made to attain a monodisperse distribution by using chemical techniques to precisely separate and extract only the semiconductor nanoparticles of a specific particle size from semiconductor nanoparticles having a wide distribution of particle sizes immediately after preparation. The attempts to attain a monodispersed distribution of particle sizes that have been reported so far include: separation by electrophoresis that utilizes variation in the surface charge of nanoparticles depending on their particle sizes; exclusion chromatography that utilizes differences in retention time due to different particle sizes; size-selective precipitation that utilizes differences in dispersibility in an organic solvent due to differences in particle sizes; and size-selective photoetching that utilizes the oxidative dissolution of a metal chalcogenide semiconductor in the presence of dissolved oxygen when irradiated with light.

The aforementioned production methods are carried out by preparing semiconductor nanoparticles having a wide distribution of particle sizes and then regulating and selecting the particles sizes. An example of a method for preparing previously monodispersed nanoparticles is the reversed micelle method that utilizes amphiphilic molecules. In this method, reversed micelles are formed in a non-polar solvent. The inside of the reversed micelle is regarded as a reaction field, and the size of the reaction field is regulated, thereby sorting nanoparticles into uniform particle sizes. This has been the most commonly employed method up to the present, and is the easiest method of particle size preparation. When monodispersion by the reversed micelle method is carried out, the distribution of particle sizes is approximately several dozen percentage points. Semiconductor nanoparticles emit fluorescence upon the application of excitation light, and the wavelength of this fluorescence is determined by the particle size. Specifically, a fluorescence spectrum whose full width at half maximum (FWHM) is narrow cannot be obtained where there is a wide distribution of particle sizes. Accordingly, the distribution of particle sizes should be further reduced in order to prepare semiconductor nanoparticles which emit relatively monochromatic fluorescences.

In contrast, size-selective photoetching for attaining monodispersion of particle sizes that utilizes the oxidative dissolution of a metal chalcogenide semiconductor in the presence of dissolved oxygen when irradiated with light has been heretofore used as a method for preparing monodispersed semiconductor nanoparticles having a wide distribution of particle sizes. In this method, particle size selection or the like is unnecessary, and particle sizes can be monodispersed in a bulk solution. When the semiconductor nanoparticles obtained by this method are irradiated with light having a wavelength of 476.5 nm, the average particle size is 3.2 nm and the standard deviation is 0.19 nm. These semiconductor nanoparticles exhibit a very narrow distribution of particle sizes, i.e., the standard deviation is approximately 6% of the average particle size. This indicates that the distribution of particle sizes is very close to the monodispersed state.

Previous methods of production of semiconductor nanoparticles required a stabilizer, and it was difficult to combine this production method with the latter monodispersion into a sequential method.

Therefore, an object of the present invention is to develop an effective sequential method for producing monodispersed semiconductor nanoparticles.

SUMMARY OF THE INVENTION

In order to attain the above object, the method for producing semiconductor nanoparticles according to the present invention comprises steps of: forming semiconductor nanoparticles in the reaction field in the micelle or reversed micelle; and regulating the particle size of the semiconductor nanoparticles by size-selective photoetching. In this method, the reaction field in the micelle or in the reverse micelle serves also as the dissolution field for ions that are produced when the semiconductor nanoparticles are subjected to size-selective photoetching.

The term "reaction field" used herein refers to a reaction region in the micelle or reverse micelle where semiconductor nanoparticles are formed from ingredient compounds in a solvent. The term "dissolution field" refers to a region where ion components produced through the dissolution of semiconductor nanoparticles are dissolved upon particle size regulation by size-selective photoetching.

In the present invention, high quality semiconductor nanoparticles were prepared as follows. The reaction field was allowed to serve also as the dissolution field, and the advantage of the micelle method or reversed micelle method was combined with that of the photoetching to prepare a sequential method.

In the present invention, the particle sizes of the semiconductor nanoparticles can be regulated by adjusting the size of the dissolution field for ions and regulating the reactivity of size-selective photoetching.

The size of the dissolution field for ions can be adjusted depending on the water content or the aqueous solution content in the reaction field in the micelle or in the reversed micelle, i.e., the dissolution field for ions, or the reaction field for vesicles (lipid bilayer membrane).

The present invention is not limited to the case where the formation of the semiconductor nanoparticles is followed by size-selective photoetching as described above. Alternatively, previously formed bulk semiconductor nanoparticles may be isolated and then subjected to size-selective photoetching. More specifically, according to another method for producing semiconductor nanoparticles of the present invention, bulk semiconductor nanoparticles, the surfaces of which have not been modified, are isolated and then subjected to size-selective photoetching.

Preferably, the means for isolation is any of reversed micelle formation, micelle formation, vesicles (lipid bilayer membrane) formation, or addition of a stabilizer comprising an inorganic or organic compound.

Further, the present invention provides semiconductor nanoparticles which are produced by any of the aforementioned methods for producing semiconductor nanoparticles wherein the particle sizes of the semiconductor nanoparticles exhibit deviations of less than 10% rms in diameter.

PREFERRED EMBODIMENT OF THE INVENTION

Figure 1:
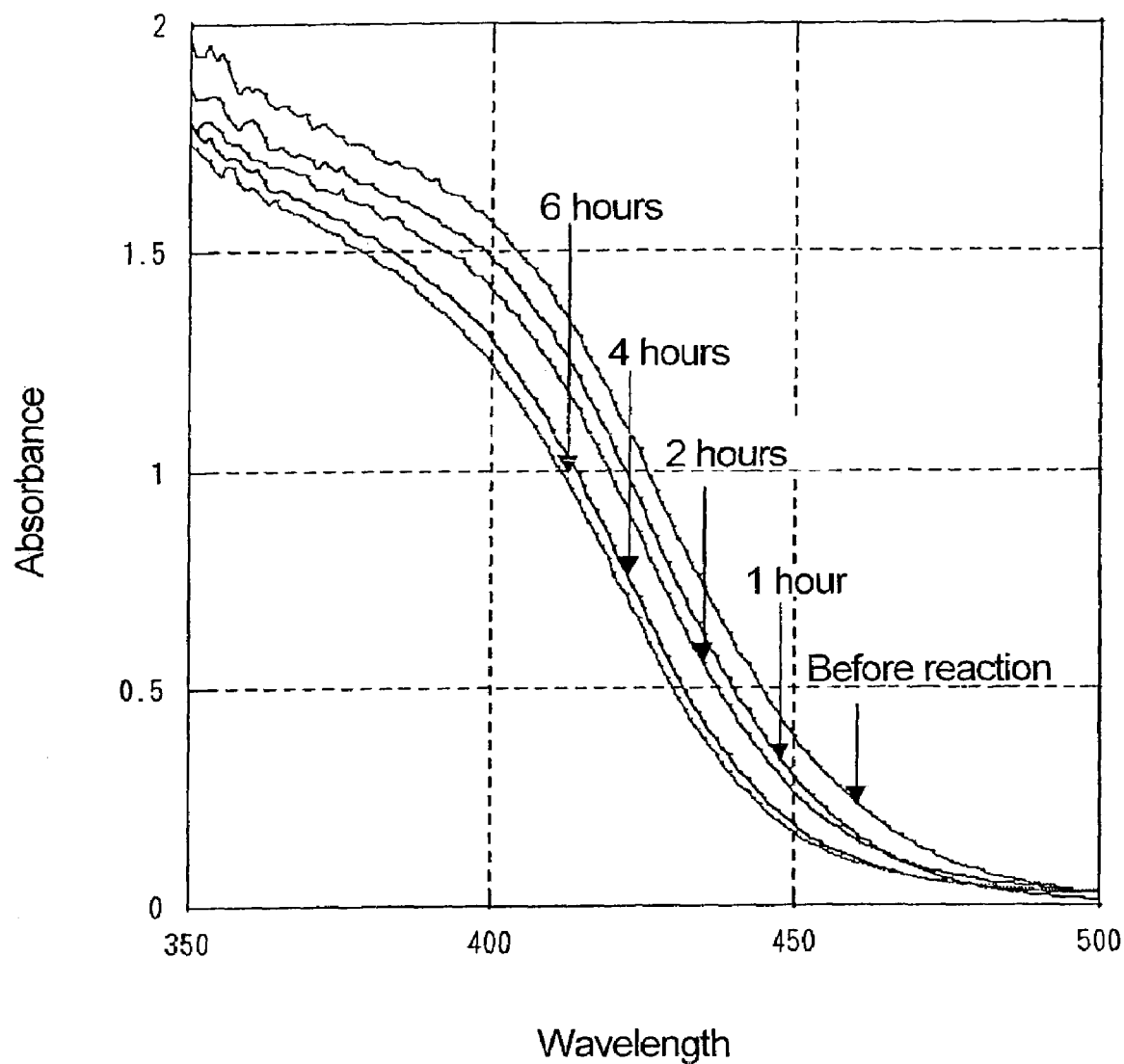
FIG. 1 shows changes with the elapse of time in the absorbance spectrum in the reversed micelle caused by size-selective photoetching.

Size-selective photoetching is first described. Due to the quantum-size effect, the physicochemical properties of semiconductor nanoparticles depend on their particle sizes. Accordingly, the physical properties of these semiconductor nanoparticles in this state are averaged out and their traits cannot be fully manifested. Thus, there is a need to use chemical techniques to precisely separate and extract only the semiconductor nanoparticles of a specific particle size from semiconductor nanoparticles having a wide distribution of particle sizes immediately after preparation in order to attain monodispersed distributions.

An example of the method for the above operation is size-selective photoetching. Size-selective photoetching takes advantage of the fact that the energy gap of a semiconductor nanoparticle increases due to the quantum-size effect as the particle size thereof decreases and that a metal chalcogenide semiconductor is oxidatively dissolved in the presence of dissolved oxygen when irradiated with light. In this method, the semiconductor nanoparticles having a wide distribution of particle sizes are irradiated with monochromatic light of a wavelength shorter than the wavelength of the semiconductor nanoparticle's absorption edge. This causes only the semiconductor nanoparticles of larger particle sizes to be selectively photoexcited and dissolved, thus sorting the semiconductor nanoparticles into smaller particle sizes. In this process, semiconductor nanoparticles in the solution are monodispersed and come to have a band gap fluorescence exhibiting a spectrum whose full width at half maximum is narrow depending on the monochromatic light irradiated and the particle size of the semiconductor nanoparticles.

In a semiconductor nanoparticle, the proportion of its surface area relative to its volume is very large. As a result, semiconductor nanoparticles tend to coalesce very easily. In order to allow the semiconductor nanoparticles to stably exist, measures have to be taken to prevent them from colliding or fusing with each other. A variety of measures have been devised so far, which can be roughly divided into two types. One is the physical isolation of the semiconductor nanoparticles by placing them in a solid matrix or a polymer matrix. The other is the inactivation of the particle surface by chemically modifying the metal-ion site on the particle surface with a low-molecule organic matter which is highly capable of forming a complex with the metal-ion site. In this method, the reversed micelle method is employed as an isolation means.

In the reversed micelle method, the reaction is carried out in the reversed micelle which is formed by amphiphilic molecules in a non-polar solvent. The surfaces of semiconductor nanoparticles in the reversed micelle are exposed as such, and thus, they are much preferred when modifying the surfaces of semiconductor nanoparticles. The semiconductor nanoparticles prepared by the reverse micelle method can be monodispersed if the reaction field in the reversed micelle is small. However, as the size of the reaction field in the reverse micelle increases, dispersion becomes larger. Accordingly, the distribution of particle sizes should be further reduced in order to prepare semiconductor nanoparticles which emit relatively monochromatic fluorescences.

In the present invention, size-selective photoetching of semiconductor nanoparticles with exposed surfaces is carried out in the reaction field in the reversed micelle to perform particle size regulation. Thus, more monodispersed semiconductor nanoparticles can be obtained.

Similarly, when the reaction field in the micelle is used, particle sizes are regulated when the surfaces of the semiconductor nanoparticles are exposed. Thus, more monodispersed semiconductor nanoparticles can be obtained. Further, particle sizes are regulated when the surfaces of semiconductor nanoparticles are exposed by isolating previously formed semiconductor nanoparticles, thereby obtaining more monodispersed semiconductor nanoparticles.

The present invention is hereafter described in more detail with reference to the following examples.

EXAMPLE 1

At the outset, 14 g of di-2-ethylhexyl sodium sulfosuccinate (AOT) and 4 cm$^3$ of ultrapure water were added to 200 cm$^3$ of n-heptane, and the mixture was stirred for 40 minutes to prepare a reversed micelle solution of AOT. This solution was divided into two portions of 100 cm$^3$ each. An aqueous solution of 1.0 mol·dm$^{-3}$ CdCl$_2$ (0.4 cm$^3$) was added to one portion and an aqueous solution of 1.0 mol·dm$^{-3}$ Na$_2$S (0.4 cm$^3$) was added to the other. Both portions were stirred to homogeneity. Thereafter, these two portions were mixed with each other, and the resultant was further stirred for 1 hour. Thus, a reversed micelle colloidal solution of CdS nanoparticles was prepared. An aqueous solution of 250 μM methyl viologen (1.2 ml) was added to this solution. The mixture was stirred for several hours, irradiated with monochromatic light, and then subjected to size-selective photoetching.

Changes with the elapse of time in the absorbance properties in this case are shown in FIG. 1. It was confirmed that photoetching was present also in the reaction field in the reversed micelle. 3-Mercaptopropionic acid was added to the thus-prepared reversed micelle solution of semiconductor nanoparticles for the purpose of surface stabilization, and the mixture was stirred overnight. Thus, monodispersed semiconductor nanoparticles with a carboxyl group exposed on their surfaces were prepared. In order to isolate semiconductor nanoparticles from this solution, the solution was tansferred into separate centrifugation tubes, and the tubes were filled up with the addition of methanol, followed by vigorous stirring. Centrifugation was then carried out, the supernatant was discarded, and the precipitate was collected. Further, heptane was added to the resulting precipitate, and the mixture was vigorously stirred. Thereafter, centrifugation was carried out, the precipitate was collected, a mixed solution of water and methanol was added to the resulting precipitate, the mixture was vigorously stirred, and centrifugation was then carried out to collect the precipitate. This procedure was repeated several times to conduct washing. Saturated NaCl was finally added to the resultant precipitate to solubilize it in water.

EXAMPLE 2

When photoetching is carried out in the reaction field in the reversed micelle, the rate of progress is very slow. One of the reasons therefor is that there is not enough dissolution field for ions by photoetching. Thus, the reaction field in the reversed micelle was enlarged and the amount of precursors of semiconductor nanoparticles per micelle reacted was decreased to form dissolution fields for ions in the reversed micelle.

At the outset, 14 g of di-2-ethylhexyl sodium sulfosuccinate (AOT) and 4.5 cm$^3$ of ultrapure water were added to 200 cm$^3$ of n-heptane, and the mixture was stirred for 40 minutes to prepare a reversed micelle solution of AOT. This solution was divided in two portions of 100 cm$^3$ each. An aqueous solution of 1.0 mol·dm$^{-3}$ CdCl$_2$ (0.4 cm$^3$) was added to one portion and an aqueous solution of 1.0 mol·dm$^{-3}$ Na$_2$S (0.4 cm$^3$) was added to the other. Both portions were stirred to homogeneity. Thereafter, these two portions were mixed with each other, and the resultant was further stirred for 1 hour. Thus, a reversed micelle colloidal solution of CdS nanoparticles was prepared. An aqueous solution of 250 μM methyl viologen (1.7 ml) was added to this solution. The mixture was stirred for several hours, irradiated with monochromatic light, and then subjected to size-selective photoetching.

Figure 2:
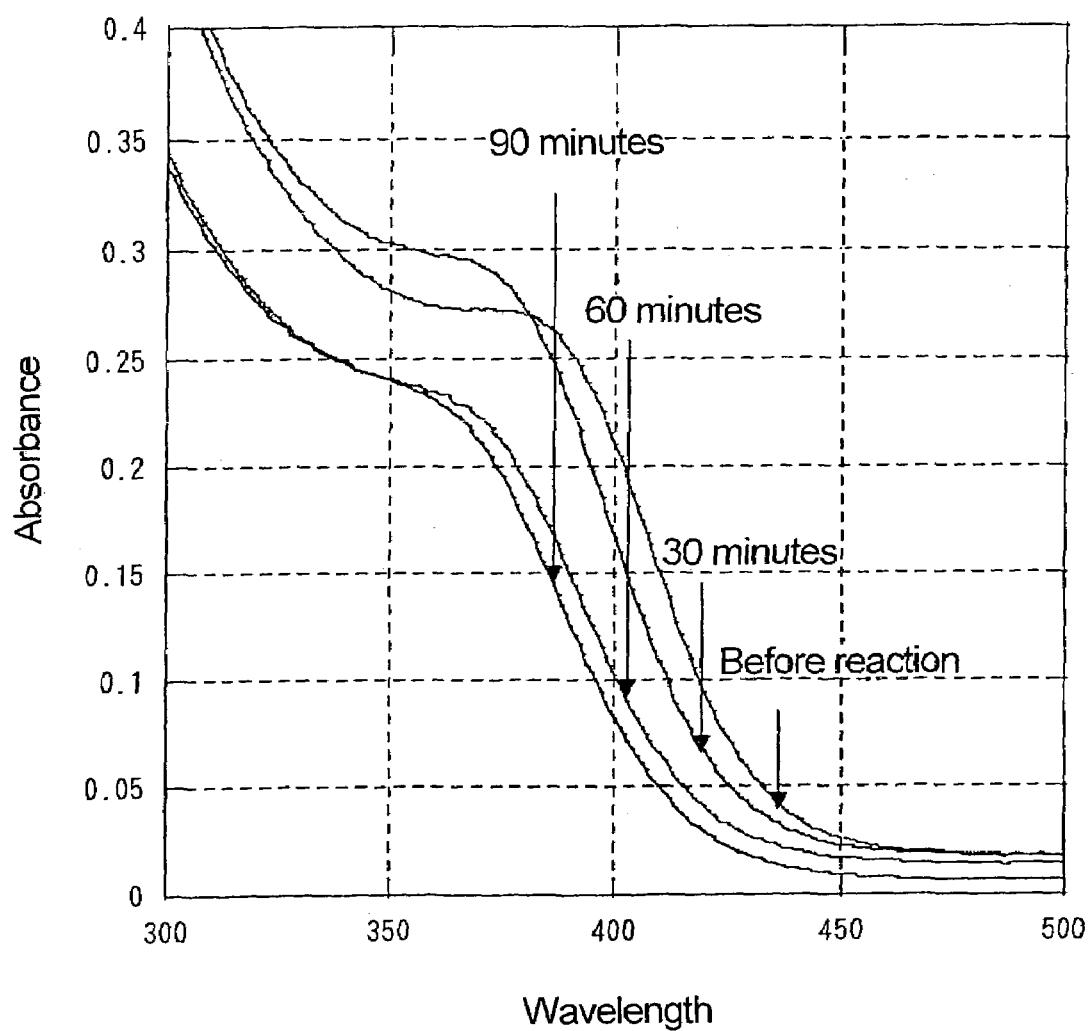
FIG. 2 shows changes with the elapse of time in the absorbance spectrum in the reversed micelle with an enlarged dissolution field caused by size-selective photoetching.

Changes with the elapse of time in the absorbance properties in this case are shown in FIG. 2. 3-Mercaptopropionic acid was added to the thus-prepared reversed micelle solution of semiconductor nanoparticles for the purpose of surface stabilization, and the mixture was stirred overnight. Thus, monodispersed semiconductor nanoparticles with a carboxyl group exposed on their surfaces were prepared. In order to isolate semiconductor nanoparticles from this solution, the solution was transferred into separate centrifugation tubes, and the tubes were filled up with the addition of methanol, followed by vigorous stirring. Centrifugation was then carried out, the supernatant was discarded, and the precipitate was collected. Further, heptane was added to the resulting precipitate, and the mixture was vigorously stirred. Thereafter, centrifugation was carried out, the precipitate was collected, a mixed solution of water and methanol was added to the resulting precipitate, the mixture was vigorously stirred, and centrifugation was then carried out to collect the precipitate. This procedure was repeated several times to conduct washing. Saturated NaCl was finally added to the resultant precipitate to solubilize it in water.

According to the comparison between the method of Example 1 and the method of Example 2, the rate of dissolution and the amount dissolved are higher in the method of Example 2. Specifically, regulation of dissolution fields for ions can regulate the amount reacted and the rate of reaction. In other words, the method of Example 1 can be utilized to finely adjust the particle size and the method of Example 2 can be utilized to regulate and monodisperse the particle size.

Semiconductor nanoparticles were prepared by the reversed micelle method in the above examples, however, the present invention is not limited thereto. Similar results can be attained when semiconductor nanoparticles are prepared by the micelle method or when semiconductor nanoparticles are prepared by isolating previously formed bulk semiconductor nanoparticles by reversed micelle formation, micelle formation, vesicles (lipid bilayer membrane) formation, or addition of a stabilizer comprising an inorganic or organic compound and subjecting the isolated semiconductor nanoparticles to size-selective photoetching.

EFFECT OF THE INVENTION

The present invention enables the particle size regulation of semiconductor nanoparticles by size-selective photoetching. During this process, the surfaces of the semiconductor nanoparticles are exposed. This enables effective surface modification of semiconductor nanoparticles.

What is claimed is:

1. A method for producing semiconductor nanoparticles comprising steps of:
   forming semiconductor nanoparticles in a reaction field in a micelle or reversed micelle; and
   regulating particle sizes of the semiconductor nanoparticles by size-selective photoetching,
   wherein the reaction field in the micelle or reversed micelle serves also as a dissolution field for ions that are produced when the semiconductor nanoparticles are subjected to the size-selective photoetching.

2. The method for producing semiconductor nanoparticles according to claim 1, wherein the particle size of the semiconductor nanoparticles is regulated by adjusting the size of the dissolution field for ions and regulating the reactivity of size-selective photoetching.

3. The method for producing semiconductor nanoparticles according to claim 2, wherein the size of the dissolution field for ions is adjusted depending on the water content or the aqueous solution content in the reaction field in the micelle or reversed micelle, i.e., the dissolution field for ions, or in the reaction field for vesicles (lipid bilayer membrane).

4. A method for producing semiconductor nanoparticles, comprising: isolating bulk semiconductor nanoparticles, the surfaces of which have not been modified, by reversed micelle formation, micelle formation, vesicles (lipid bilayer membrane) formation, or addition of a stabilizer comprising an inorganic or organic compound; and
   subjecting the isolated bulk semiconductor nanoparticles to size-selective photoetching, wherein a reaction field in a micelle, a reversed micelle, a vesicle, or the stabilizer serves also as a dissolution field for ions that are produced when the semiconductor nanoparticles are subjected to the size-selective photoetching.

* * * * *